Patented Oct. 12, 1937

2,095,508

UNITED STATES PATENT OFFICE 2,095,508

PROCESS OF MANUFACTURING NAPHTHENATES

Friedrich Meidert, Frankfort-on-the-Main-Griesheim, Germany, assignor to I. G. Farbenindustrie Aktiengesellschaft, Frankfort-on-the-Main, Germany No Drawing. Application February 23, 1932, Serial No. 594,737. In Germany March 2, 1931

5 Claims. (Cl. 134—57)

This invention relates to a process for producing naphthenic acid salts and more particularly those of the earth metals, the metallic elements of the rare earths and of the acid-forming earth metals.

When precipitating at ordinary temperatures soaps derived from naphthenic acids with solutions of metal salts, the precipitates obtained are in a pasty and sticky condition, so that it is very difficult and all but impossible to wash them out thoroughly at ordinary temperatures either before or after separation of the mother liquor inasmuch as rather considerable amounts of the alkali metal salts formed are left behind in the precipitate, whereby the value of the naphthenates and their percentage contents of active siccative metals are greatly impaired and the varnishes and lacquers produced therewith are unfavorably influenced. Moreover, it is very difficult to separate the precipitated naphthenates from the mother liquor by suction on an industrial scale, the filter pores being easily clogged up by the toughish products of precipitation.

When drying the naphthenates in a drying chamber as usually done, at about 40° C., much time and labor is necessary so that a drying operation becomes very expensive, and besides it is only imperfect as, at the temperature indicated, a superficial incrustation takes place, whereby the further evaporation of the occluded water is rendered difficult or even impossible; this water content, moreover, likewise impairs the treatment of the naphthenates in question in the manufacture of varnishes and lacquers.

Now I have found that these drawbacks in the manufacture of naphthenates of the earth metals (aluminium), the rare earth metals (cerium, zirconium, lanthanum and similar metals), and the acid-forming earth metals (such as vanadium) can easily be avoided and the difficulty of the washing out operation can be completely overcome by carrying out the steps consisting in the neutralization of the naphthenic acid (commonly called saponification), in the precipitation and in washing the precipitated product, while maintaining the liquid in the boiling state. By this means the alkali metal salts formed by double decomposition, are retained in the solution and may be completely removed by, for instance, three washing operations.

After the water employed in the final wash has been withdrawn, the desiccation and drying may be carried out in the same reaction vessel without any difficulty by maintaining the washed product in a molten state, generally at 130 to 140° C., until the water is completely removed. The molten naphthenate, thus purified, may be directly run into suitable containers from the producing vessel.

Preferably, soluble salts of the metals in question, such as chlorides, sulfates, nitrates, acetates and so on, are employed as precipitants for the naphthenate solution.

Furthermore, I have ascertained that it is very advantageous, especially when working up products having a softening point higher than 130 to 140° C. or melting at these temperatures rather slowly, such as, for instance, aluminum naphthenate, to add to the naphthenates during or after the precipitation or after melting a liquid or an easily meltable product, in order to facilitate the melting of the naphthenates and to avoid decomposition. As such mediums, generally such compounds are suitable which yield in any ratio a homogeneous mass with a naphthenate melting at a low temperature. Especially suited are, for instance, the drying and semi-drying oils, such as linseed oil or linseed oil acids, soy bean oil or soy bean oil acids, however, likewise the non-drying oils, such as castor oil or its acids, and such compounds as liquid triaryl phosphates such as tricresylphosphate, cyclohexanone and other products known as softening agents in the industry dealing with the manufacture of plastic masses. In the following claims by the term "plasticizers" there are to be understood all these substances which facilitate the melting of the naphthenates; this term comprises both the additional substances which at ordinary temperature are liquid and those which at ordinary temperature are solid.

The removal of water from the naphthenate may be accelerated during the melting operation by application of a vacuum. By shortening the time for drying and by keeping away the atmospheric oxygen, light-colored products are obtained. The evaporation of the water in a vacuum may be further accelerated by adding to the naphthenate easily evaporating organic compounds, such as benzene, xylol, white spirit or other compounds forming with water an azeotropic mixture.

The preparation of the aforementioned naphthenates is thus considerably simplified by the present process and the drying is effected far more rapidly than otherwise. The obtained products are far superior as regards their purity and quality to those obtained by other processes and are much more suitable for use in the manufacture of lacquers and varnishes.

The naphthenates of aluminum, the rare earths and the acid-forming earth metals are suitable as oil-thickening agents and sizing agents. Furthermore, they may be used as assistants in the manufacture of siccatives, the action of which may be essentially enhanced. In this case, they may be used either together with the heavy metal and alkaline earth metal salts of naphthenic acid or together with linoleates and resinates.

In an analogous manner, mixed naphthenates of heavy metals and earth metals, rare earth metals and acid-forming earth metals, may be prepared in a single step of working.

The following examples serve to illustrate my invention, the parts being by weight:—

*Example 1.*—1000 parts of crude or purified naphthenic acid are saponified while boiling and stirring with a solution of 200 to 210 parts of caustic soda in accordance with the acid number of the naphthenic acid. The clear soap solution is quantitatively precipitated with a solution of about 320 to 330 parts of vanadyl sulfate $(VO)SO_4 \cdot 2H_2O$. The precipitate formed is washed three times with hot water and after withdrawal of the final wash it is heated in the precipitating vat to about 130 to about 140° C. until the adhering water is completely evaporated. Then the melt is directly run into suitable containers.

*Example 2.*—1000 parts of crude or purified naphthenic acid are saponified according to its acid number with a solution of 260 to 280 parts of anhydrous sodium carbonate, while stirring at boiling temperature, and the clear soap solution obtained is quantitatively precipitated with a solution of 560 to 580 parts of aluminum chloride. When finishing the precipitation, 200 parts of linseed oil are added; the precipitated aluminum naphthenate admixed with linseed oil is three times washed with water, while stirring, and finally freed from water after withdrawal of the final wash by melting it for a short time at 130 to 140° C. Then it is directly run into a suitable container.

*Example 3.*—1000 parts of naphthenic acid are saponified according to Example 1 or 2, the clear soap solution first is mixed with a solution of 310 to 320 parts of cobaltous sulfate, $CoSO_4 \cdot 7H_2O$, then 75 parts of soy bean oil fatty acids are added, thereupon the remaining naphthenic soap is quantitatively precipitated with a solution of 200 to 210 parts of cerous chloride, $CeCl_3$. The precipitation finished, 75 parts of castor oil are introduced and the precipitate is washed as mentioned above. After withdrawal of the final wash, the cobalt-cerium naphthenate with the admixed oil and fatty acids is melted at 130 to 140° C., the adhering water is evaporated and a completely homogeneous melt of low viscosity is formed.

*Example 4.*—1000 parts of naphthenic acid are saponified as indicated in Example 1 or 2, the clear soap solution is quantitatively precipitated with a solution of 480 to 490 parts of zirconium oxychloride, $(ZrO)Cl_2 \cdot 8H_2O$, and the precipitate formed is washed with water as mentioned in the foregoing examples. After withdrawal of the final wash, 50 parts of toluol are added and the zirconium naphthenate is freed from water by heating it under reduced pressure.

In the foregoing examples the saponification of the naphthenic acid may be carried out with a corresponding potassium compound.

What I claim is:—

1. In the process of producing a composition of matter for driers containing naphthenates of the group consisting of aluminium, cerium, zirconium, lanthanum and vanadium by precipitating said naphthenates by the interaction of aqueous solutions of salts of said metals with aqueous solutions of alkali metal naphthenates the improvement which comprises washing the precipitated naphthenate with water at boiling temperature and drying the washed precipitate, admixed with a plasticizer, while maintaining it in a molten state until the water is completely vaporized.

2. In the process of producing a composition of matter for driers containing naphthenates of the group consisting of aluminium, cerium, zirconium, lanthanum and vanadium by precipitating said naphthenates by the interaction of aqueous solutions of salts of said metals with aqueous solutions of alkali metal naphthenates the improvement which comprises washing the precipitated naphthenate with water at boiling temperature and drying the washed precipitate, admixed with a plasticizer, while maintaining it in a molten state under reduced pressure, until the water is completely vaporized.

3. In the process of producing a composition of matter for driers containing naphthenates of the group consisting of aluminium, cerium, zirconium, lanthanum and vanadium by precipitating said naphthenates by the interaction of aqueous solutions of salts of said metals with aqueous solutions of alkali metal naphthenates the improvement which comprises washing the precipitated naphthenate with water at boiling temperature and drying the washed precipitate, admixed with a plasticizer, by heating it to a temperature of about 130° C. to about 140° C. until the water is completely vaporized.

4. In the process of producing a composition of matter for driers containing naphthenates of the group consisting of aluminium, cerium, zirconium, lanthanum and vanadium by precipitating said naphthenates by the interaction of aqueous solutions of salts of said metals with aqueous solutions of alkali metal naphthenates the improvement which comprises washing the precipitated naphthenate with water at boiling temperature and drying the washed precipitate, admixed with a plasticizer, while maintaining it in a molten state until the water is completely vaporized, the precipitating, washing and drying operations being carried out in the same vessel.

5. In the process of producing a composition of matter for driers containing aluminium naphthenate by precipitating aluminium naphthenate by the interaction of aqueous solutions of an aluminium salt with aqueous solutions of alkali metal naphthenates the improvement which comprises washing the precipitated aluminium naphthenate with water at boiling temperature and drying the washed precipitate, admixed with a plasticizer, while maintaining it in a molten state until the water is completely vaporized.

FRIEDRICH MEIDERT.